March 7, 1939.  F. L. MAIN ET AL  2,149,614

BRAKE MECHANISM

Filed June 17, 1936   6 Sheets-Sheet 1

INVENTORS
FRANK L. MAIN
CHARLES A. SAWTELLE
BY
*Whittemore Hulbert & Belknap*
ATTORNEYS

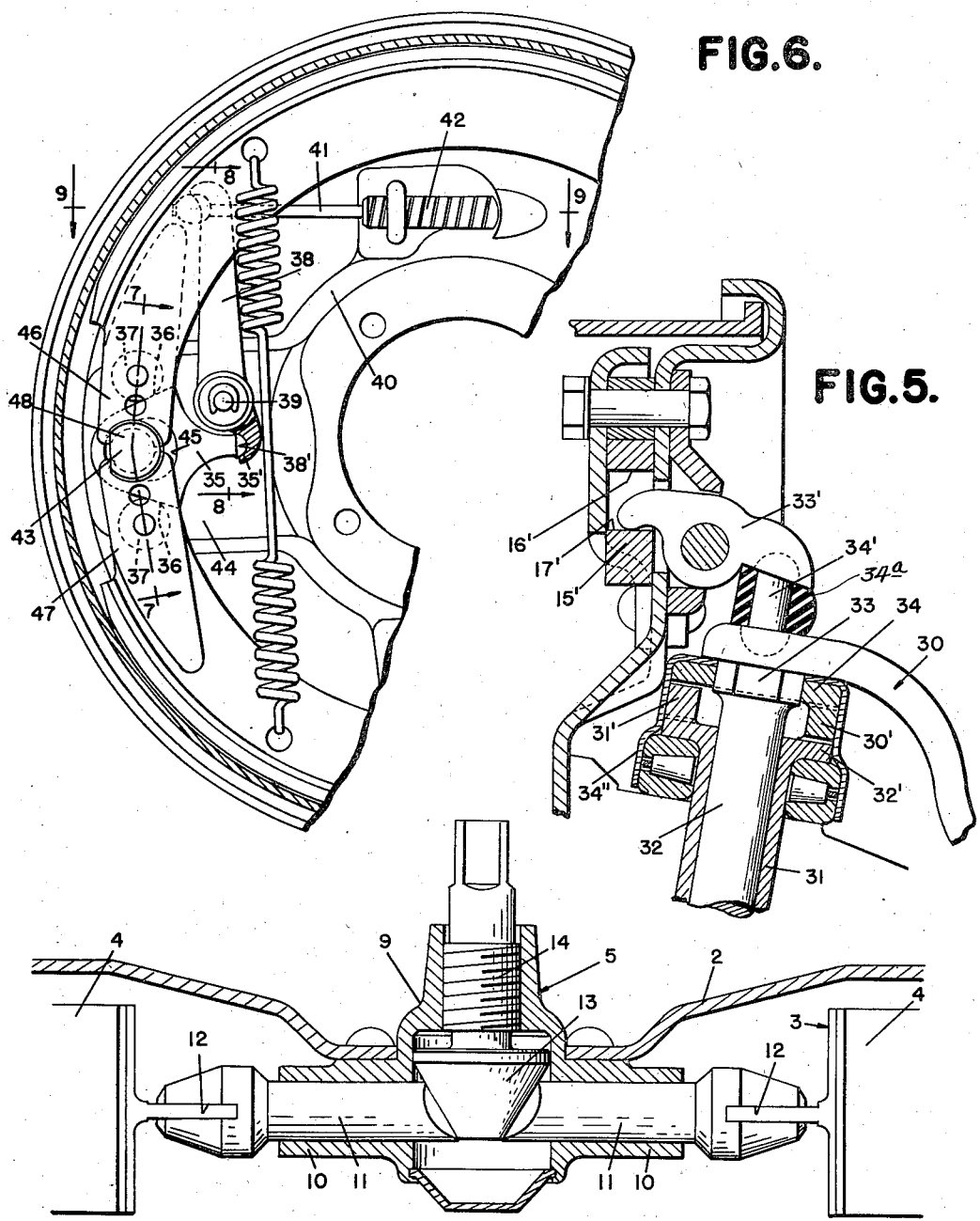

March 7, 1939. F. L. MAIN ET AL 2,149,614
BRAKE MECHANISM
Filed June 17, 1936 6 Sheets-Sheet 3
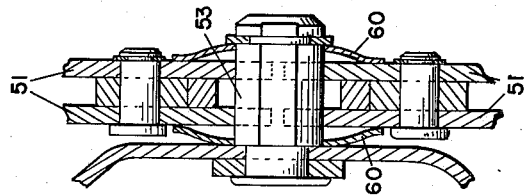
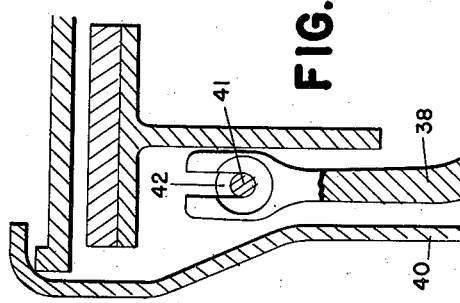
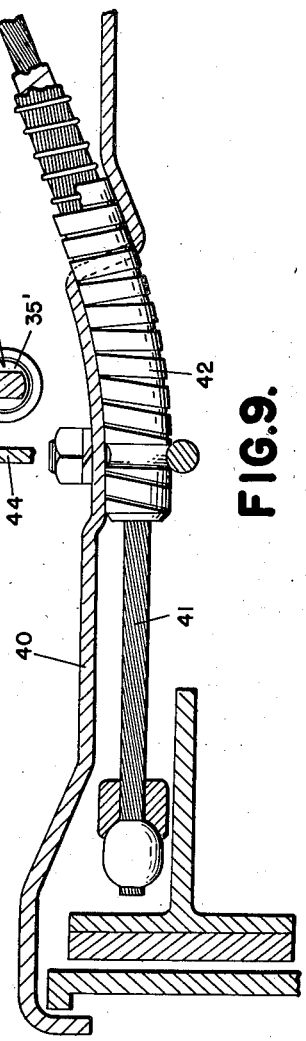
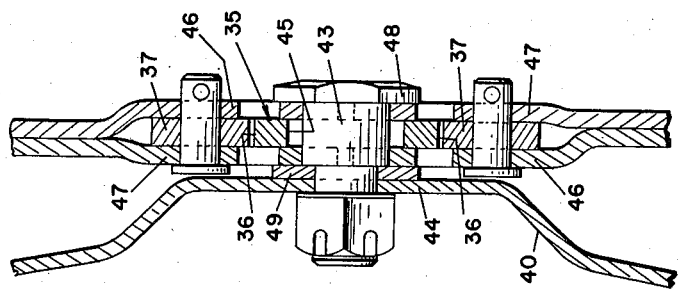
INVENTORS
FRANK L. MAIN
CHARLES A. SAWTELLE
BY
ATTORNEYS

INVENTORS
FRANK L. MAIN
CHARLES A. SAWTELLE
ATTORNEYS

March 7, 1939.　　F. L. MAIN ET AL　　2,149,614
BRAKE MECHANISM
Filed June 17, 1936　　6 Sheets-Sheet 5

INVENTORS
FRANK L. MAIN
CHARLES A. SAWTELLE
BY Whittemore Hulbert & Belknap,
ATTORNEYS March 7, 1939.　　　F. L. MAIN ET AL　　　2,149,614
BRAKE MECHANISM
Filed June 17, 1936　　　6 Sheets-Sheet 6

INVENTORS
FRANK L. MAIN
CHARLES A. SAWTELLE
BY
ATTORNEYS

Patented Mar. 7, 1939

2,149,614

UNITED STATES PATENT OFFICE 2,149,614

BRAKE MECHANISM

Frank L. Main, Birmingham, and Charles A. Sawtelle, Detroit, Mich., assignors to Kelsey-Hayes Wheel Company, Detroit, Mich., a corporation of Delaware Application June 17, 1936, Serial No. 85,778

13 Claims. (Cl. 188—78)

The invention relates to brake mechanism and has for one of its objects to provide an improved means for forcing the brake friction element into engagement with the drum. The invention has for another object to so construct the actuator for the brake friction element that its parts may be readily and economically formed and assembled. The invention has for a further object to so construct the brake mechanism that the anchor device and the actuating device serve to guide the brake friction element and to laterally position the same with respect to the backing plate, thereby avoiding the necessity of other positioning means.

The invention has for these and other objects the novel combinations and arrangements of parts as more fully hereinafter set forth.

In the drawings:

Figure 1 is a side elevation of a brake mechanism showing an embodiment of my invention;

Figures 2, 3 and 4 are cross sections respectively on the lines 2—2, 3—3 and 4—4 of Figure 1;

Figure 5 is a view similar to Figure 2 showing a modification;

Figure 6 is a view similar to Figure 1 showing another embodiment of my invention;

Figure 1:
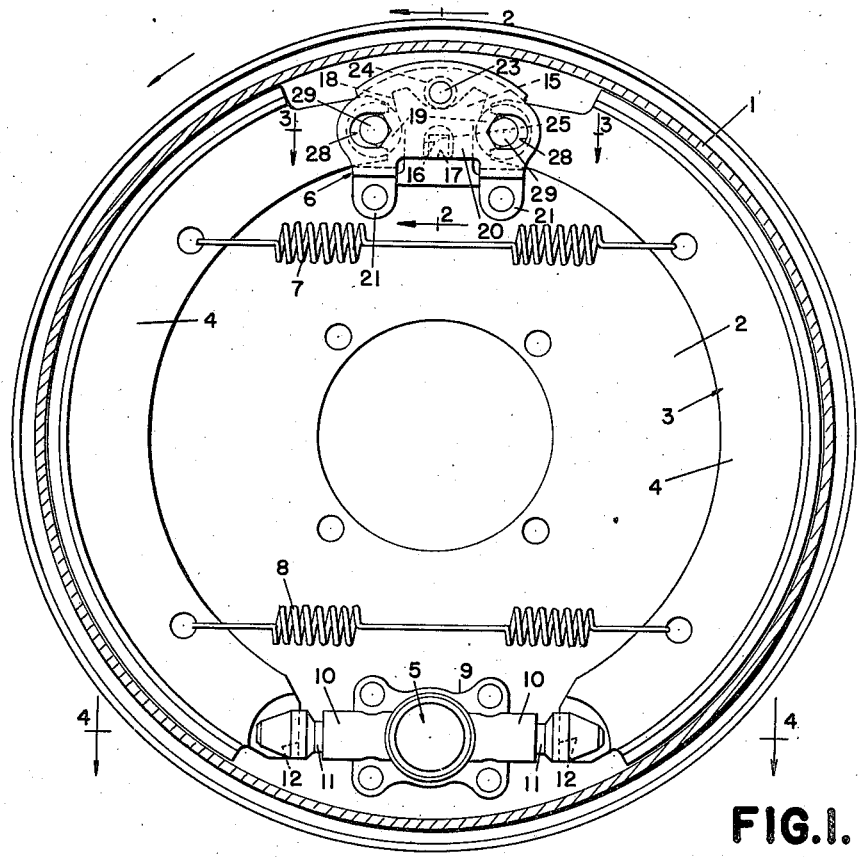
Figure 10:
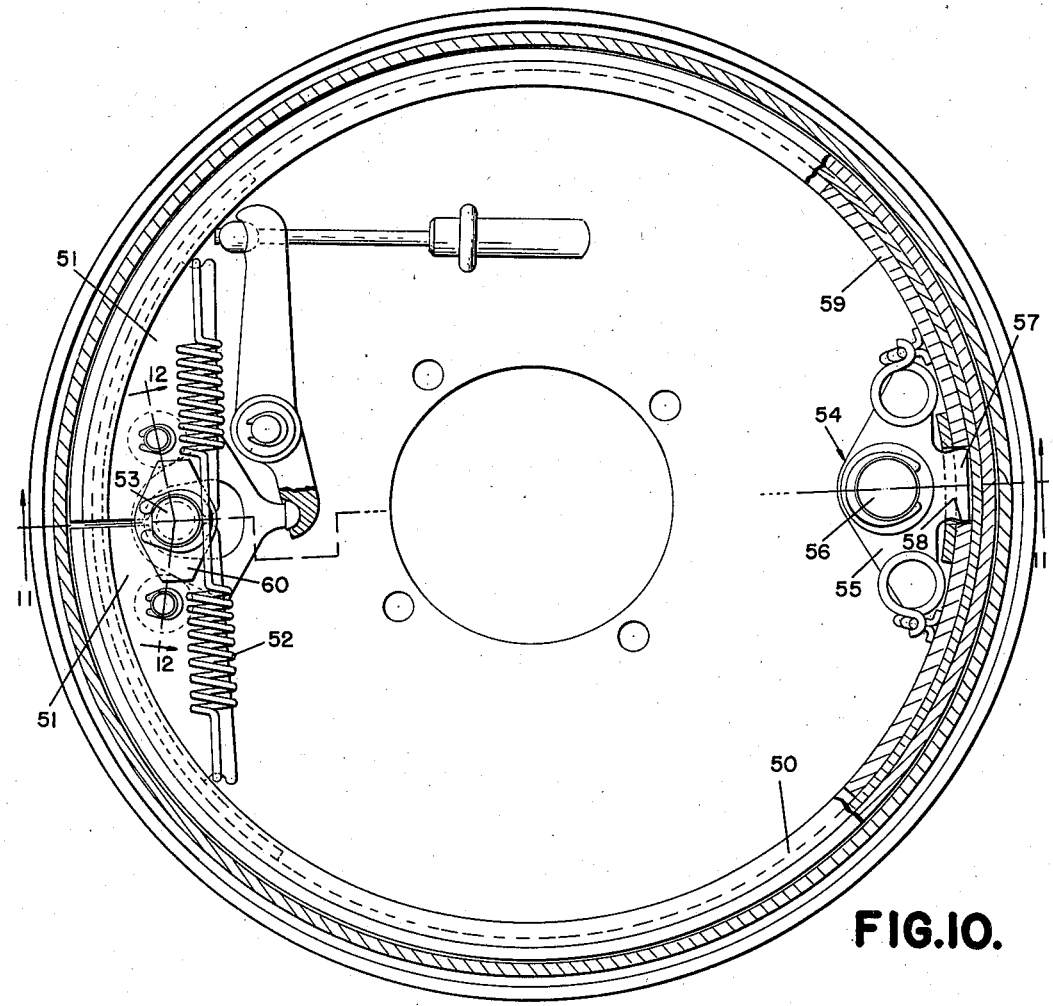
Figure 11:
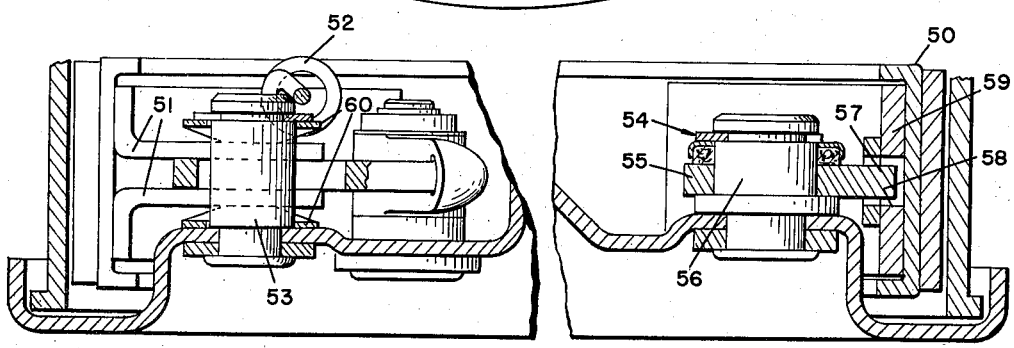

Figures 7, 8 and 9 are cross sections respectively on the lines 7—7, 8—8 and 9—9 of Figure 6;

Figure 10 is a view similar to Figure 1 showing another embodiment of my invention;

Figures 11 and 12 are cross sections respectively on the lines 11—11 and 12—12 of Figure 10.

Figure 13:
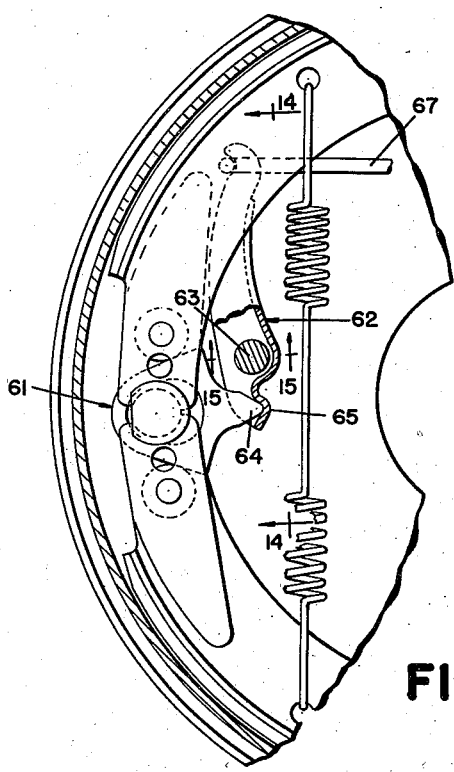
Figure 15:
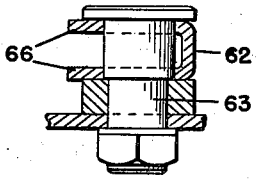
Figure 14:
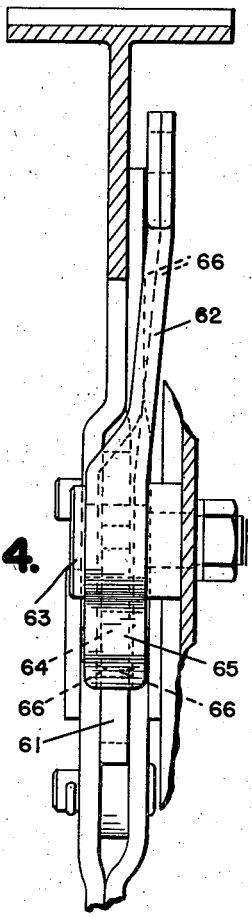
Figure 16:
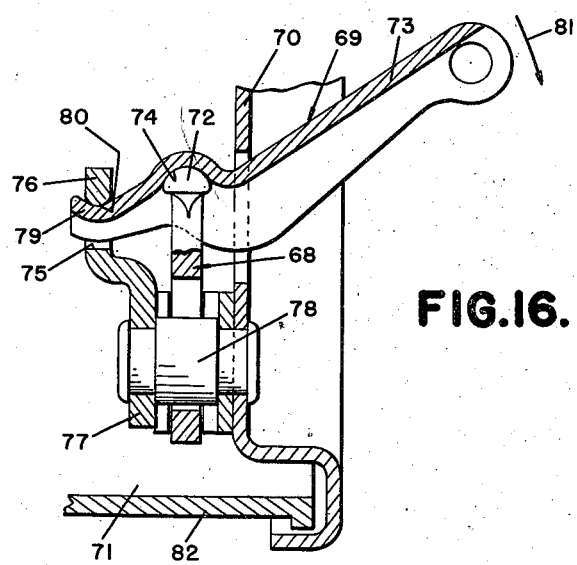
Figure 17:
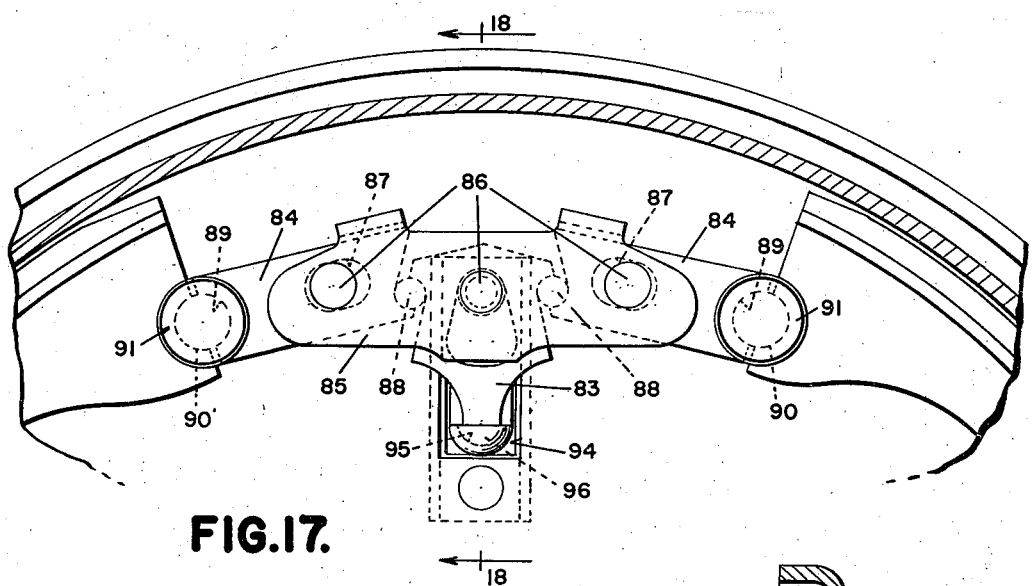
Figure 18:
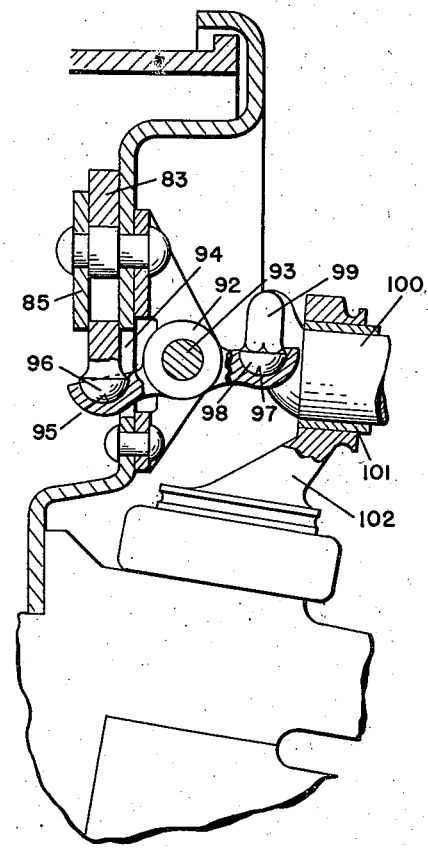
Figure 19:
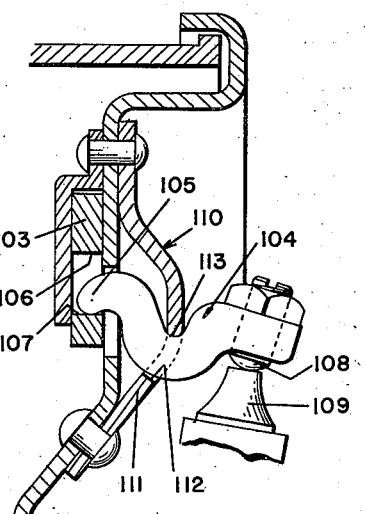

Figure 13 is a fragmentary side elevational view partly in section of another modified form of brake mechanism;

Figure 14 is a sectional view taken substantially on the plane indicated by the line 14—14 of Figure 13;

Figure 15 is a cross sectional view taken substantially on the plane indicated by the line 15—15 of Figure 13;

Figure 16 is a fragmentary sectional view illustrating still another modified form of brake actuating means;

Figure 17 is a fragmentary side elevational view of a further embodiment of this invention;

Figure 18 is a sectional view taken substantially on the plane indicated by the line 18—18 of Figure 17; and Figure 19 is a fragmentary sectional view of a further modified form of brake mechanism.

The brake mechanism illustrated in Figures 1 to 4 inclusive comprises the brake drum 1, the backing plate 2 and the brake friction element 3 within the brake drum and engageable with its annular brake flange. The brake friction element, as shown in the present instance, comprises the brake shoes 4 which are preferably of T cross section having between their lower ends the adjustment anchor device 5 and between their upper ends the actuator 6, which latter is adapted to force the brake shoes into frictional engagement with the brake flange. Suitable coil springs 7 and 8 extending between the upper and lower ends of the brake shoes are adapted to retract and hold the same in their normal or inoperative positions.

The adjustment anchor device comprises the adjustment bracket 9 having at the inner side of the backing plate 2 the tubular portions 10 which guide the axially aligned adjustment links 11. The outer ends of these links are formed with the slots 12 for receiving the lower end portions of the stems or flanges of the brake shoes. As a result, it will be seen that the adjustment anchor device guides these lower ends and positions the same laterally relative to the backing plate. A suitable wedge 13 is engageable with the inner ends of the links and this wedge is adapted to be adjusted by means of the screw 14 which threadedly engages the adjustment bracket.

The actuator 6 has the longitudinally movable wedge 15 which, as shown, is movable radially of the brake drum and backing plate. The wedge 15 is centrally apertured as at 16 and is provided with a shoulder 17 formed by the inner side of the aperture. The side edges of the wedge are inclined at 18 upwardly and away from each other and are engageable with the rollers 19 upon the upper ends of the shoes. As shown, there are a pair of rollers at the upper end of each shoe with a roller of each pair at opposite sides of the extensions of the stem or flange of the shoe. The actuator also has the sheet metal plate 20 having at its lower end the foot flanges 21 which are rigidly secured to the backing plate by suitable means such as rivets. The plate 20 has the back 22 which is spaced from the adjacent portion of the backing plate a distance sufficient to receive the wedge and the upper ends of the shoes with their rollers. The upper portion of this back is secured in fixed relation to the backing plate by means of the stud 23 and the spacer 24. The portion of the backing plate to which the actuator plate is secured is laterally offset inwardly to aline the wedge with the upper ends of the shoes. With this arrangement it will be seen that the upper ends of the shoes and also the wedge for actuating the same are positively guided.

Figures 2, 3:
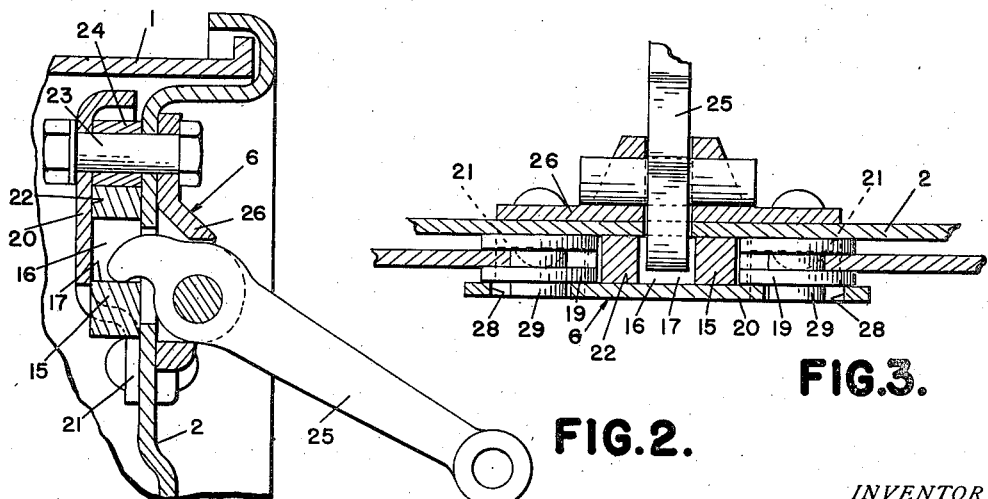

For actuating the wedge, there is the lever 25 which is pivotally mounted intermediate its ends upon the mounting plate 26 secured to the outer side of the backing plate. This lever extends transversely of and through the backing plate and into the opening 16 of the wedge and has its inner end engageable with the shoulder 17. The normal position of the lever is as shown in Figure 2 and it will be apparent that upon swinging of this lever from normal position the wedge will be moved radially inwardly relative to the drum and backing plate so that it will spread apart the upper ends of the shoes and force the latter into frictional engagement with the brake flange.

For limiting the return movement of the wedge and for also centering this wedge, the upper edge of the wedge is made concave with the spacer 24.

For positioning the upper ends of the shoes in their retracted position with respect to the brake flange, the plate 20 is formed with the elongated openings 28, the inner ends of which are V-shaped and are engageable with the axial extensions 29 of the rollers 19.

The embodiment of the invention shown in Figure 5 illustrates a brake in association with one of the front steering wheels of a vehicle, and differs from the modification previously described in that the shoe actuating wedge 15' is moved radially inwardly to expand the shoes into engagement with the brake flange of the drum by means of an arm 30 supported for rocking movement about the axis of the king pin 31. In detail, the outer end of the arm 30 is integrally or otherwise permanently secured to the upper end of a rockshaft 32 journalled in the king pin 31 and having a polygonal shaped portion 33 immediately below the arm 30. The polygonal portion 33 is received in a correspondingly shaped opening formed in the cam disc 34 and the latter is provided with circumferentially spaced depending cam portions 30' positioned for engagement with corresponding cam portions 31' extending upwardly from the head 32' on the upper end of the cam pin 31.

From the foregoing, it will be noted that rocking movement of the lever 30 effects a corresponding rocking movement of the cam member 34 relative to the head 32' on the king pin 31. In other words, rocking movement of the lever 30 causes the cam portions 30' to ride upwardly on the cam portions 31' and thereby effects a raising of the outer end of the lever 30. Upward displacement of the outer end of the lever 30 by the cooperating engaging cams is transferred to a radial inward movement of the wedge 15' by means of a rocker 33' pivotally supported intermediate the ends thereof on the backing plate for the brake drum. The outer end of the rocker extends into the opening 16' of the wedge 15' through a radially extending slot in the backing plate and engages the shoulder 17' formed by the lower wall of the opening 16'. The inner end of the rocker is operatively connected to the lever 30 by means of a pin 34' coaxially arranged with respect to the king pin and having semi-spherically shaped opposite end portions respectively engaging within correspondingly shaped recesses formed in the inner end of the rocker and the outer end of the lever. The pin 34' is held in assembled relationship by means of the rocker 33' through the medium of the usual brake shoe retracting springs, and a suitable rubber block 34a is interposed between the rocker and lever to reduce noise to the minimum. It necessarily follows from the foregoing that upward movement of the lever 30, effected by rocking the latter about the axis of the king pin 31, causes a rocking movement of the rocker 33' in a direction to engage the outer end of the rocker with the shoulder 17' on the wedge and effects a movement of the wedge in a radially inward direction to expand the shoes into engagement with the brake flange of the drum. It will be noted from Figure 5 that the cams and the bearing for the enlarged portion 32' of the king pin are concealed by a cover 34" movable as a unit with the lever 30 and slidably engaging the periphery of the king pin bearing.

Figures 6 to 9 inclusive disclose another embodiment of our invention differing in the construction of actuator. 35 is the longitudinally movable wedge which in this instance is movable radially outwardly relative to the brake drum and the backing plate. This wedge has the inclined edges 36 which diverge radially inwardly and which are engageable with the rollers 37 upon the adjacent shoe ends. The wedge is adapted to be actuated by the lever 38 which is pivotally mounted upon the stud 39 secured to the backing plate 40. The end of this lever engageable with the wedge is preferably made with the rounded recess 38' and the portion of the wedge cooperating with the lever is made with the rounded head 35' for fitting in the recess. The other end of the lever is connected to the cable 41 which passes through the guide 42 secured to and extending through the backing plate. It will be noted that the lever extends parallel to the backing plate and that its end connected to the cable is offset from its hub to clear the stem or flange of the adjacent brake shoe.

43 is a stud secured to the bottom of the inwardly offset portion 44 of the backing plate. This stud extends through a central opening 45 in the wedge 35 and the dimensions of the opening transversely of the wedge or peripherally of the brake drum are greater than the diameter of the encircled portion of the stud to provide clearance so that the wedge may fulcrum about the lever 38 to compensate for unequal movement of the brake shoes.

In the present instance, each of the rollers 37 is positioned between an extension 46 of the stem or flange of the associated brake shoe and the plate 47 which is fixedly secured to the stem or flange. The wedge 35 also extends between each of the extensions 46 and its associated plate 47. The stud 43 has at its inner end the enlargement 48 having guiding engagement with the plates 47 and has sleeved over its reduced portion the washer 49 which rests against the bottom of the recessed portion of the backing plate and has sliding engagement with the extensions 46, the arrangement being such that the ends of the shoes and the wedge are guided. This abutment also limits the retractile movement of these ends of the shoes, it being engageable with the concave ends of the extensions 46 and plates 47.

In the modification shown in Figures 10, 11 and 12, the brake friction element comprises the band 50 which is transversely split at one point only. 51 are brackets secured to the end portions of the bands, corresponding brackets being connected by the coil spring 52 which is adapted to retract the band from frictional engagement with the brake flange. The ends of these brackets are made concave to abut the stud 53 which is secured to the backing plate. The construction of the wedge is the same as that described in the previous modification, as is also the construction of the means for actuating the wedge.

54 is an anchor device consisting of the lever 55 and the stud 56, which latter is secured to the backing plate. The lever is journaled upon the stud and is provided with the projection 57 which is engageable in the recess 58 formed in the plate 59 This plate is secured to the intermediate portion of the band diametrically opposite the actuator and as a result the anchor laterally positions this portion of the band relative the backing plate. For laterally positioning the adjacent ends of the band and also the wedge for actuating the same, there are the resilient plates 60 which are mounted upon the stud 53 and which are engageable with the brackets 51.

The embodiment of the invention shown in Figures 13 to 15 inclusive differs from the modifications illustrated in Figure 6 in that both the wedge 61 and operating lever 62 for the wedge are stamped from sheet metal. The wedge 61 is similar in shape to the wedge 35 shown in Figure 6 and is moved radially outwardly by the operating lever 62 to actuate the brake shoes in the same manner as previously described.

The operating lever 62 is not only formed from sheet metal, but is folded in the manner shown in the drawings and is pivotally connected intermediate the ends thereof to the backing plate by means of a shouldered pin 63. Upon reference to Figure 14, it will be noted that the inner pivoted end portion of the lever 62 is channel shaped in cross section and is offset from the remaining portion of the lever to locate the same in a position permitting the lower end 64 of the wedge to extend into the channel of the lever and engage the base of the latter inwardly beyond the pivot 63. It will be observed from Figure 13 that the base of the channel shaped portion of the lever is fashioned as at 65 to form a recess for receiving the extremity of the portion 64 of the wedge. Referring again to Figure 14, it will be noted that the portion of the lever extending to the outer side of the pivot 63 is bent to engage the flanges 66 of the channel shaped portion with each other to form a double thickness of metal. The operating cable 67 is connected to the free end of the lever 62 in such a manner that a pull on the cable effects an outward movement of the wedge 61 through the lever 62 in the same manner described in connection with the embodiment of the invention shown in Figure 6.

In Figure 16, we have shown still another arrangement for moving the wedge 68 radially outwardly to actuate the brake shoes. In this embodiment a stamped actuating lever 69 of channel shaped cross section is provided, and this lever is shown as extended axially outwardly through the backing plate 70 into the brake drum 71 for engagement with the inner extremity 72 of the wedge 68. It will be observed from Figure 16 that the end portion 72 of the wedge extends into the channel of the operating lever 69 and the base 73 of the channel is bent to form a recess or pocket 74 for receiving the inner end of the wedge. The wedge actuating lever 69 projects axially inwardly beyond the wedge 68 through an opening 75 in an arm 76 having an axially outwardly offset portion 77 secured to the backing plate 70 by means of the wedge stud 78. The portion of the base 73 of the operating lever located in the opening 75 is transversely curved as at 79 for engaging the correspondingly curved radially inner wall 80 of the opening 75. The arrangement is such that the arcuate wall 80 of the opening 75 in the arm 76 forms a fulcrum for the lever 73, with the result that when the free outer end of the lever is moved in the direction of the arrow 81, the wedge 68 is moved radially outwardly relative to the stud 78 to expand the brake shoes into engagement with the brake flange 82 of the drum. This construction is relatively simple and lends itself to inexpensive manufacture.

In the embodiment of the invention, shown in Figures 17 and 18, the wedge 83 is movable radially outwardly between the spaced ends of the shoes and is operatively connected to the latter through the medium of links 84. The wedge 83 is supported on the backing plate for radial outward movement in substantially the same manner defined in connection with the embodiment of the invention illustrated in Figure 6, and is held in assembled relation with the backing plate by means of a retainer plate 85 secured in axial spaced relationship to the backing plate by means of the rivets 86. The inner ends of the links 84 extend between the two plates and are provided with elongated slots 87 for receiving the rivets 86. The length of the slots 87 is such as to provide the movement of the links by the wedge 83 required to expand the brake shoes into engagement with the braking surface. As shown in Figure 17, a roller 88 is disposed between the opposite inclined edges of the cam and the adjacent inner ends of the links 84 so that radial outward movement of the wedge will effect the desired movement of the links 84 through the rollers 88. The rollers 88 are held in place by cooperating shoulders respectively formed on the inner ends of the links 84 and the opposite sides of the wedge 83. Thus, it will be seen that the rollers, in effect, float between the wedge and the links, with the result that friction is reduced to the minimum. The outer ends of the links 84 are recessed as at 89 and the adjacent web portions of the brake shoes are correspondingly recessed to form openings for receiving the shank portions 90 of suitable studs 91. The studs 91 are provided with enlarged head portions at opposite ends and serve to align the links with respect to the brake shoes.

It will be noted from Figure 18 that the means for radially moving the wedge 83 outwardly comprises a rock arm 92 pivotally supported intermediate the ends thereof on the backing plate at the outer side of the latter by means of a pin 93. The inner end of the rock arm extends through a radially extending slot 94 in the backing plate and is provided with a semi-spherical recess 95 for receiving the correspondingly shaped inner end 96 of the wedge 83. The outer end of the arm is also provided with a semi-spherical recess 97 for receiving a correspondingly shaped head 98 on the crank 99 forming a part of the rockshaft 100. The rockshaft 100 is journalled in a bearing 101 secured in a fixed bracket 102. It may be pointed out at this time that in adapting this construction to the front steering wheels of the vehicle, the joint between the outer end of the rock arm 92 and the crank 99 is arranged substantially on the axis of a king pin so that the brake mechanism is not effected by turning of the front wheels. From the foregoing, it will be noted that rocking of the shaft 100 in a direction to apply the brakes causes the crank 99 to rock the arm 92 in a direction to move the wedge 83 radially outwardly and this movement of the wedge expands the brake shoes into engagement with the braking surface through the medium of the links 84.

The embodiment of the invention shown in Figure 19, is directed to brake mechanism of the type wherein the brake shoes are expanded into engagement with the braking surface by radial inward movement of the wedge 103. In this construction, the wedge is actuated by means of a rocker 104 having the inner end 105 extending through the backing plate into an opening 106 formed in the wedge for engagement with the radially inner side wall 107 of the opening. The outer end of the arm is provided with an adjustable abutment 108 engageable with an actuating element 109.

The rocker 104 is supported for pivotal movement intermediate the ends thereof by means of a plate 110 permanently secured to the rear side of the backing plate for the drum and having an axially -outwardly bowed portion 111 slotted as at 112 for receiving the central portion of the rocker 104. In this connection, it will be noted that the central portion of the rocker 104 is curved radially inwardly to provide a recess 113 for receiving the radially outer marginal edge of the opening 112. The arrangement is such that the rocker 104 is pivotally mounted within the opening 112 for swinging movement about the radially outer edge of this opening.

Rocking movement of the rocker 104 to actuate the wedge is effected by moving the operator 109 radially outwardly, and this may be accomplished through the medium of a cam and lever arrangement identical to the one defined in connection with the embodiment of the invention illustrated in Figure 5. It is also pointed out that the wedge 103 may be operatively connected to the brake shoes in the manner shown in Figures 1 to 4 inclusive to expand the shoes into engagement with the braking surface upon radially inward movement of the wedge.

What we claim as our invention is:

1. In brake mechanism, the combination with a brake drum, a backing plate and a brake friction element within and engageable with said drum, of an element for forcing said friction element into engagement with said drum, and a plate secured to said backing plate and having a portion spaced axially from said backing plate and forming with the latter axially spaced surfaces receiving therebetween the second mentioned element and the portions of the first mentioned element to guide said elements.

2. In brake mechanism, the combination with a brake drum, a backing plate and a brake friction element within and engageable with said drum, of an element for forcing said friction element into engagement with said drum, a plate secured to said backing plate for guiding said second mentioned element, said second mentioned plate being provided with a V-shaped abutment, and means upon said friction element engageable with said abutment and cooperating therewith to locate said friction element in its retracted position.

3. In brake mechanism, the combination with a brake drum, a backing plate and a brake friction element within and engageable with said drum, of a longitudinally movable wedge for forcing said friction element into engagement with said drum, said wedge being provided with a concave end, and means secured to said backing plate and extending transversely of said wedge and engageable with said concave end for limiting movement of said wedge in one direction and for centering said wedge.

4. In brake mechanism, the combination with a brake drum, a backing plate and a brake friction element within and engageable with said drum, of a wedge for forcing said friction element into engagement with said drum, and a stud secured to said backing plate and directly engaging said friction element to limit its retractile movement, said wedge having an opening through which the said stud extends of greater dimensions than the encircled portion of said stud and providing clearance for movement of said wedge in a peripheral direction with said friction element.

5. In brake mechanism, the combination with a brake drum, a backing plate, a brake friction element within and engageable with said drum, and a swivel mounting for the brake drum, backing plate and frictional element including a king pin, of a longitudinally movable wedge for forcing the friction element into engagement with said drum, a lever supported for swinging movement about the axis of the king pin, and means effective upon movement of the lever in one direction about the axis of the king pin to move the wedge in a direction to force the friction element into engagement with the drum.

6. In brake mechanism, the combination with a brake drum, a backing plate, a brake friction element within and engageable with said drum, and a swivel mounting for the brake drum, backing plate and frictional element including a king pin, of a longitudinally movable wedge for forcing the friction element into engagement with the drum, a lever pivotally supported exteriorly of the drum about the axis of the king pin, means effective upon swinging movement of the lever in one direction to effect a displacement of the lever in the general direction of the axis of the king pin, and means between the wedge and lever effective upon movement of the latter in one direction along the axis of the king pin to move the wedge in a direction to force the friction element into engagement with the drum.

7. In brake mechanism, the combination with a brake drum, a backing plate, a brake friction element within and engageable with said drum, and a swivel mounting for the brake drum, backing plate and frictional element including a king pin, of a longitudinally movable wedge for forcing the friction element into engagement with the drum, a lever supported exteriorly of the drum for swinging movement about the axis of the king pin, cooperating engaging cam members effective upon swinging movement of the lever to displace the latter in the general direction of the axis of the king pin, a rock arm pivotally supported intermediate the ends thereof on the backing plate exteriorly of the drum and having one end extending through the backing plate for engagement with the wedge, and a connection between the opposite end of the rock arm and the lever effective upon axial displacement of the latter in one direction to move the wedge in a direction to force the friction element into engagement with the drum.

8. In brake mechanism, the combination with a brake drum, a backing plate, a brake friction element within and engageable with said drum, and a swivel mounting for the brake drum, backing plate and frictional element including a king pin, of a longitudinally movable wedge for forcing the friction element into engagement with the drum, a rock arm pivotally supported intermediate the ends thereof on the backing plate exteriorly of the drum and having one end extending through the backing plate for engagement with the wedge, a rock shaft supported for rocking movement about an axis extending transverse to the axis of rocking movement of the arm, and means effective upon rocking said shaft in one direction to move the wedge through the rock arm in a direction to force the friction element into engagement with the drum.

9. In brake mechanism, the combination with a drum, a backing plate and a brake friction element within and engageable with said drum, of a longitudinally movable wedge for forcing the friction element into engagement with the drum, a lever extending transversely through the backing plate and having a portion engageable with the wedge to actuate the same, and means engageable with the lever at a point spaced axially inwardly from the point of engagement of the lever with the wedge and providing a fulcrum for the latter.

10. In brake mechanism, the combination with a brake drum, a backing plate and a brake friction element engageable with said drum, of a longitudinally movable wedge for forcing said friction element into engagement with the drum, a lever extending transversely through the opening in the backing plate into the drum and having a portion intermediate the ends thereof engageable with the wedge for actuating the latter, and a member fixed to the backing plate at the axial inner side of the wedge and having a portion engageable with the free end of the lever to form a fulcrum for the latter.

11. In brake mechanism, a brake drum, a backing plate for said drum, brake friction means supported on the backing plate within the drum and having spaced ends, a plate secured to the inner side of the backing plate and having a portion opposite the ends of the friction means offset axially inwardly to form with the backing plate a retainer adapted to receive said ends of the friction means through the opposite sides thereof, and a wedge supported within the retainer between the ends of the friction means for longitudinal sliding movement relative to said ends and friction means.

12. In brake mechanism, a brake drum, a backing plate for said drum, brake friction means supported on the backing plate within the drum and having spaced ends, a plate secured to the inner side of the backing plate and having a portion opposite the ends of the friction means offset axially inwardly to form with the backing plate a retainer adapted to receive said ends of the friction means through the opposite sides thereof, a wedge supported within the retainer between the ends of the friction means for longitudinal sliding movement relative to said ends and friction means, and a lever pivotally mounted upon the backing plate at the outer side of the latter and having a portion extending through an opening in the backing plate into engagement with said wedge for actuating the latter.

13. In brake mechanism, a brake drum, a backing plate for said drum, brake friction means supported on the backing plate within the drum and having spaced ends, a plate secured to the inner side of the backing plate and having a portion opposite the ends of the friction means offset axially inwardly to form with the backing plate a retainer adapted to receive said ends of the friction means through the opposite sides thereof, a wedge supported within the retainer between the ends of the friction means for longitudinal sliding movement relative to said ends and friction means, said wedge having an opening therethrough, and a lever pivotally mounted upon the backing plate and extending transversely through the backing plate into the opening in the wedge for engagement with one side of the opening to actuate the wedge.

FRANK L. MAIN.
CHARLES A. SAWTELLE.